United States Patent [19]

DeVogelaere et al.

[11] Patent Number: 4,474,085
[45] Date of Patent: Oct. 2, 1984

[54] TRANSMISSION FLOOR SHIFTER CONTROL WITH A PARK/LOCK MECHANISM

[75] Inventors: Richard A. DeVogelaere, Ortonville; Carl D. Simancik, Troy, both of Mich.

[73] Assignee: General Motors Corporation, Detroit, Mich.

[21] Appl. No.: 416,875

[22] Filed: Sep. 13, 1982

[51] Int. Cl.³ .............................................. B60K 41/04
[52] U.S. Cl. .................................. 74/878; 74/483 PB; 74/475; 74/538; 70/248
[58] Field of Search .................... 192/4 A, 3.63, 0.052; 74/878, 483 R, 483 PB, 475, 538; 70/248, 254, 195

[56] References Cited
U.S. PATENT DOCUMENTS

| | | | |
|---|---|---|---|
| 4,232,571 | 11/1980 | Kimberlin | 74/878 |
| 4,235,123 | 11/1980 | Simancik et al. | 74/878 X |
| 4,249,404 | 2/1981 | Kimberlin | 74/878 |
| 4,304,112 | 12/1981 | Osborn | 74/538 X |

Primary Examiner—George H. Krizmanich
Attorney, Agent, or Firm—Donald F. Scherer

[57] ABSTRACT

A floor mounted transmission shift control has a shift lever with a pushbutton mechanism for releasing the detent mechanism so that shifting from the Park position can be accomplished. The Park/Lock lever is pivotally mounted on the shift control assembly and has one end thereof connected through a lost motion mechanism with the detent pushbutton mechanism and the other end thereof connected with an ignition lock control cable. The one end of the Park/Lock lever is normally not aligned with the pivot axis of the shift lever but is alignable therewith by the operation of the pushbutton mechanism. The ignition lock control cable prevents pivoting of the Park/Lock lever unless the vehicle ignition is unlocked thus preventing shifting from the Park position when the ignition lock control cable is held stationary. The alignment between the shift lever axis and the one end of the Park/Lock lever reduces the loading on the shift lever during manual change to and from the Park position.

3 Claims, 6 Drawing Figures

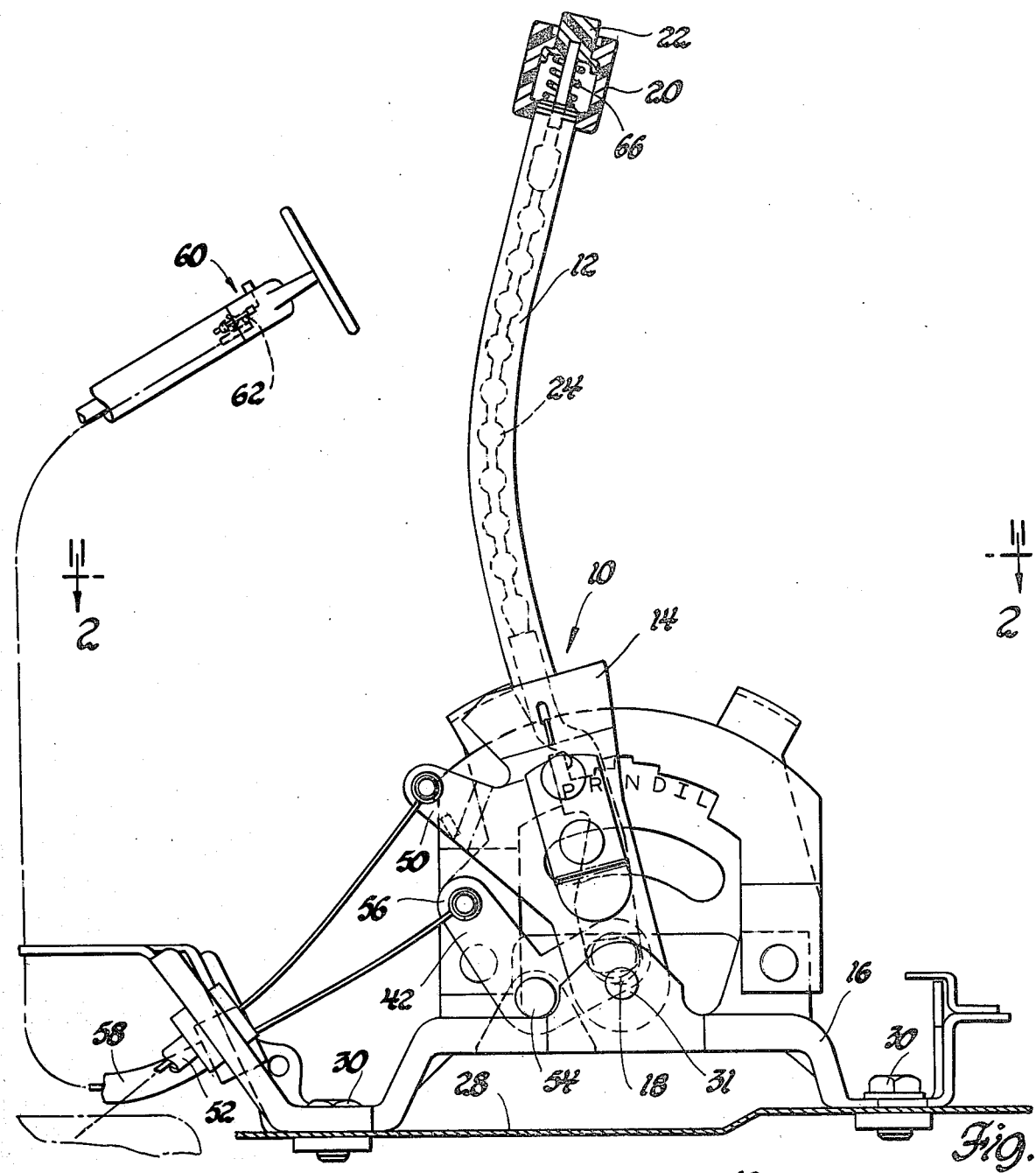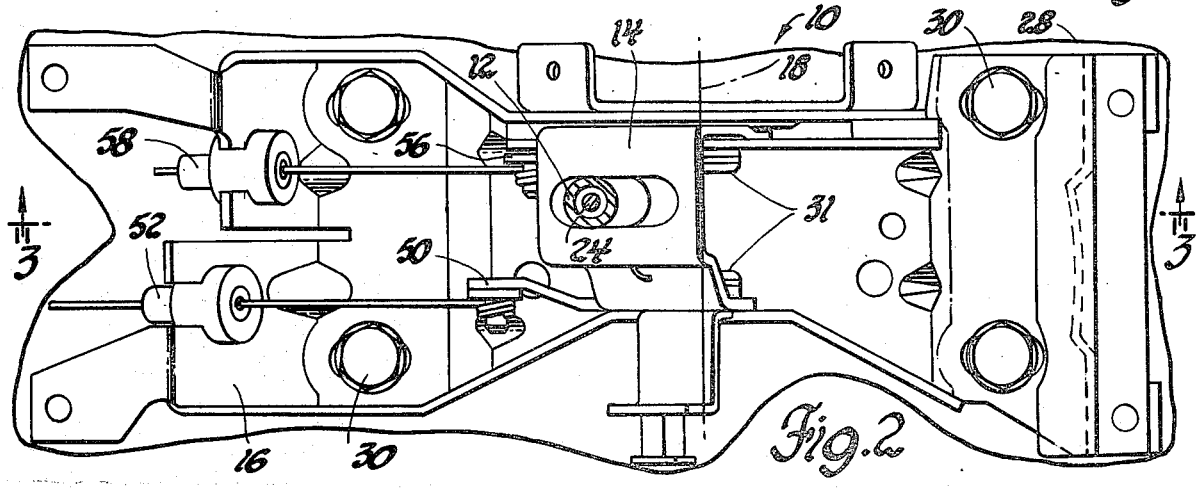

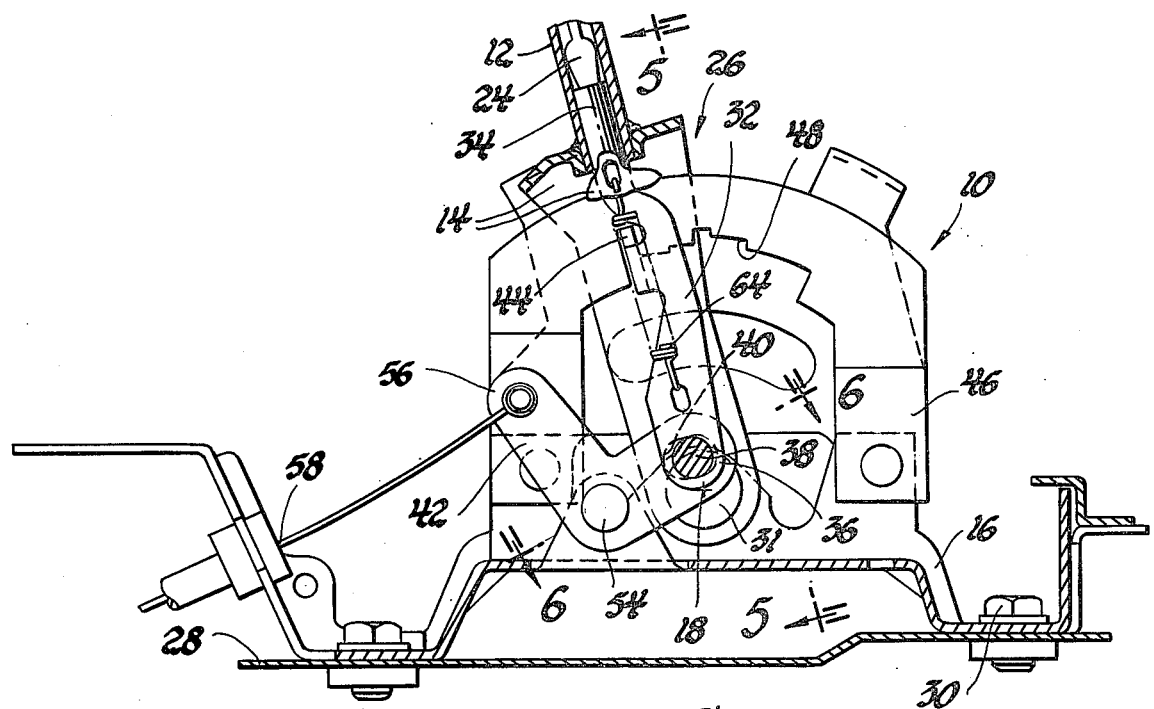

TRANSMISSION FLOOR SHIFTER CONTROL WITH A PARK/LOCK MECHANISM

This invention relates to floor mounted shift controls and more particularly to such controls having an interconnection with the vehicle ignition lock mechanism.

It is an object of this invention to provide an improved floor mounted transmission shift control mechanism wherein a manually operable detent mechanism is secured against operation to prevent removal from the Park position unless the vehicle ignition is unlocked.

It is another object of this invention to provide an improved transmission shift control mechanism wherein the transmission shift lever has a manually operated pushbutton which is connected to the shift detent mechanism and is controlled by a Park/Lock lever connected to the ignition lock so that the pushbutton cannot operate the detent mechanism to be disengaged thus permitting removal of the shift lever from the Park position unless the ignition is unlocked.

It is a further object of this invention to provide an improved floor mounted shift control mechanism wherein a pivotable shift lever has a pushbutton operated detent mechanism which is operatively connected with a Park/Lock lever pivotally mounted on the shift control mechanism and wherein said Park/Lock lever has one end controlled by actuation of the vehicle ignition lock and the other end connected through a lost motion mechanism to the detent mechanism such that the said other end is alignable with the pivot axis of the shift lever when the vehicle ignition is unlocked and the pushbutton is manipulated to actuate the detent mechanism.

It is a still further object of this invention to provide an improved transmission shift control mechanism having an improved Park/Lock mechanism wherein the transmission shift control lever has a pushbutton for shift detent release and wherein the pushbutton is connected to a Park/Lock lever which is operatively connected to and controlled by the vehicle ignition lock such that prevention of movement of the pushbutton is established when the ignition is locked whereby the detent cannot be disengaged and the shift control cannot be removed from the Park position.

These and other objects and advantages of the present invention will be more apparent from the following description and drawings in which:

FIG. 1 is an elevational view partly in section depicting a transmission shift control mechanism and a diagrammatic representation of a vehicle steering column;

FIG. 2 is a view taken along line 2—2 of FIG. 1;

FIG. 3 is a view taken along line 3—3 of FIG. 2;

FIG. 4 is a view similar to FIG. 3 showing another operating position of the mechanism;

FIG. 5 is a view taken along line 5—5 of FIG. 3; and

FIG. 6 is a view taken along line 6—6 of FIG. 3.

Referring to the drawings, wherein like characters represent the same or corresponding parts throughout the several views, there is seen in FIG. 1 a shift control mechanism, generally designated 10, and including a shift lever 12 secured to a bracket 14 which is pivotally mounted on a base member 16 for movement about an axis 18. The shift lever 12 has secured to the upper end thereof a handgrip member 20 which is disposed therein a pushbutton 22. The pushbutton 22 is connected through a flexible force transmitting member 24 to a detent mechanism generally designated 26 and best seen in FIGS. 3, 4 and 5. The base member 16 is secured to a vehicle body member such as a floor pan 28 by a plurality of fasteners 30. The bracket 14 is U-shaped, as seen in FIGS. 2 and 5, and is mounted to the base 16 by a pair of rivets 31 for pivotal movement about the axis 18.

The detent mechanism 26 includes a detent rod 32 connected to the force transmitter 24. The detent rod 32 has an end portion 34 which is slidably disposed within the shift lever 12. The other end 36 of detent rod 32 is connected by a rivet 38 to an elongated opening 40 formed in a Park/Lock (P/L) lever 42. The detent rod 32 has formed thereon a latch portion 44 which is adapted to engage a detent latch plate 46 which is secured to the base member 16. The latch plate 46 has a detent cam 48 formed thereon. The detent cam 48 has a pair of slots which are formed to establish the Park "P" position and the Neutral "N" position as well as stop surfaces for Reverse "R", Drive "D" and Low "L". A stop position for Intermediate gear between Drive and Low is established in a conventional manner in a conventional transmission, not shown.

The latch 44 will engage in slots "P" and "N" and stop against surfaces "R", "D" and "L". As can be seen in FIGS. 1, 3 and 4, the "P" slot is deeper than the end slot such that a large area of the surface of latch 44 is engaged in the detent plate 46 when the Park position is established. The latch 44 is disengageable from the slots "P" and "N" by depression of the pushbutton 22 as seen in FIG. 4. When the latch 44 is disengaged from the latch plate 46, the shift lever 12 and bracket 14 can be pivoted about axis 18 to permit manual selection of the various transmission drive ratios.

As seen in FIGS. 1 and 2, the bracket 14 has an arm 50 which is connected to a cable mechanism 52 which is in turn connected with the conventional automatic transmission, not shown. The Park/Lock lever 42 is pivotally mounted on the base 16 by a rivet 54. The Park/Lock lever 42 is generally in the shape of a bellcrank and, as seen in FIGS. 1, 3 and 4, has one arm 56 of the bellcrank connected to a cable mechanism 58.

The cable mechanism 58, as seen in FIG. 1, is connected with the steering column ignition lock assembly 60. The lock assembly 60 includes a lock position control mechanism, generally designated 62, and is preferably constructed in accordance with the lock position control mechanism as shown in U.S. Ser. No. 297,232, filed Aug. 28, 1981, in the name of R. L. Kramer and assigned to the assignee of this application. The depth of slot "P" permits the control mechanism to assume the position required of ignition locking by sufficient counterclockwise pivoting of P/L lever 42.

The operation of the ignition lock mechanism will permit the cable 58 to be free for linear movement when the vehicle ignition is unlocked and will restrain linear movement of the cable 58 when the vehicle ignition is locked. A review of the abovementioned U.S. patent application will show the use of the preferred lock mechanism requires that the transmission shift mechanism be placed in the Park position before ignition locking can be accomplished.

When the ignition lock 60 is in the locked position, it will be apparent that the shift control mechanism will be in the position shown in FIGS. 1 and 3. In this position, the Park/Lock lever 42 is restrained from pivoting about rivet 54 such that the latch 44 cannot be removed from slot "P". When the latch is held within the slot "P", the transmission shift mechanism and therefore the transmission proper cannot be removed from Park such that unauthorized movement of the vehicle is prevented.

When the ignition lock is unlocked, the pushbutton 22 can be operated resulting in pivoting of the Park/Lock lever 42 such that the latch 44 will disengage the detent latch plate 46. As seen in FIG. 4, when this maneuver is accomplished, the rivet 38 will be aligned with the pivot axis 18 such that pivoting of the manual lever 12 and bracket 14 will not be restrained by the Park/Lock lever 42 or cable mechanism 58. This reduces the manual load required to operate the shift lever mechanism 10.

Release of the pushbutton 22 will permit the detent rod 32 to be moved upward by a return spring 64 such that the latch 44 will reengage the latch plate 46. The return of the pushbutton 22 is also assisted by a spring 66 which is disposed within the handgrip 20. An additional return spring can be installed in the cable assembly in a well-known manner, to increase the return force.

It should be appreciated that the Park/Lock lever 42 is continuously connected between the ignition lock 60 and the detent mechanism 26 such that relative movement between the Park/Lock lever 42 and the detent mechanism 26 occurs only when the pushbutton 22 is manipulated and not when the ignition lock is actuated.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A manually operable floor mounted transmission shift control mechanism for a motor vehicle comprising; a base member secured to the vehicle; a manually operable shift lever pivotally supported about an axis on said base member; means secured to said shift lever for operably connecting said shift lever to a transmission; a manually operable detent mechanism operatively connected between said base member and said shift lever and including detent means connected to said base member for selectively preventing pivoting of said shift lever relative to said base member and manually operable means for selectively disconnecting said detent means from said base member; Park/Lock lever means pivotally disposed on said base member on an axis parallel to the pivot axis of said shift lever, said Park/Lock lever including a first arm operatively connected with said manually operable means of said detent mechanism on an axis normally displaced from the pivot axis of said shift lever and being movable to a position coincidental to the pivot axis of said shift lever when the manually operable means is operated to permit detent disconnection and a second arm; and manually selectively actuatable lock means secured to said second arm for selectively preventing pivoting of said Park/Lock lever such that manual operation of said detent disconnecting means is prevented whereby said shift lever cannot be pivoted from a predetermined transmission selected position.

2. A manually operable floor mounted transmission shift control mechanism for a motor vehicle comprising; a base member secured to the vehicle; a manually operable shift lever pivotally supported about an axis on said base member; means secured to said shift lever for operably connecting said shift lever to a transmission; a manually operable detent mechanism operatively connected between said base member and said shift lever and including a manually operable pushbutton, a detent rod connected with the pushbutton and being guided for linear movement in said shift lever and a detent cam plate connected to said base member and being engaged by said detent rod for selectively preventing pivoting of said shift lever relative to said base member and said manually operable pushbutton being operable to selectively disconnect said detent rod from said detent cam plate; Park/Lock lever means pivotally disposed on said base member on an axis parallel to the pivot axis of said shift lever, said Park/Lock lever including a first arm operatively connected with said detent rod on an axis normally displaced from the pivot axis of said shift lever and being movable to a position coincidental to the pivot axis of said shift lever when the manually operable pushbutton is operated to permit detent disconnection and a second arm; and manually selectively actuable lock means secured to said second arm for selectively preventing pivoting of said Park/Lock lever such that manual operation of said detent disconnecting means is prevented whereby said shift lever cannot be pivoted from a predetermined transmission selected position.

3. A manually operable floor mounted transmission shift control mechanism for a motor vehicle comprising; a base member secured to the vehicle; a manually operable shift lever pivotally supported about an axis on said base member; means secured to said shift lever for operably connecting said shift lever to a transmission; a manually operable detent mechanism operatively connected between said base member and said shift lever and including detent means connected to said base member and having a plurality of position locating means including a "Park" position for selectively establishing pivotal positions of said shift lever relative to said base member, manually operable means for selectively disconnecting said detent means from said base member and spring means for urging connection of said manually operable means with said detent means; Park/Lock lever means pivotally disposed on said base member on an axis parallel to the pivot axis of said shift lever, said Park/Lock lever including a first arm operatively connected with said manually operable means of said detent mechanism on an axis normally displaced from the pivot axis of said shift lever and being movable to a position coincidental to the pivot axis of said shift lever when the manually operable means is operated to permit detent disconnection and a second arm; and manually selectively actuatable lock means secured to said second arm for selectively preventing pivoting of said Park/Lock lever such that manual operation of said detent disconnecting means is prevented whereby said shift lever cannot be pivoted from a predetermined transmission selected position, said Park/Lock lever means being pivoted in one direction by said manually operable means and in the other direction by said spring means and said pivoting in said other direction having a maximum extent when the Park position is selected.

* * * * *